United States Patent [19]

Inoue et al.

[11] Patent Number: 6,036,767
[45] Date of Patent: Mar. 14, 2000

[54] AQUEOUS PIGMENT DISPERSION COMPOSITION FOR ELECTRO-DEPOSITION COLOR COATING

[75] Inventors: Shigeyasu Inoue; Tadaaki Ito, both of Osaka, Japan

[73] Assignee: Sakura Color Products Corporation, Osaka, Japan

[21] Appl. No.: 08/865,762

[22] Filed: May 30, 1997

[30] Foreign Application Priority Data

May 31, 1996 [JP] Japan ..................................... 8-160842

[51] Int. Cl.[7] .............................. C09D 5/44; C09D 4/00; C07D 253/00
[52] U.S. Cl. .......................... 106/498; 106/493; 106/494; 204/492; 205/324; 205/332; 205/50; 428/457; 428/689; 524/91; 544/83; 544/113; 544/198
[58] Field of Search ..................................... 106/493, 494, 106/498; 204/492; 205/50, 324, 332; 544/83, 113, 198; 524/91; 428/457, 689

[56] References Cited

U.S. PATENT DOCUMENTS

| 5,188,764 | 2/1993 | Shimizu et al. | .......................... 106/493 |
| 5,380,781 | 1/1995 | Kato et al. | .............................. 523/404 |
| 5,514,213 | 5/1996 | Matsumoto et al. | .................... 106/498 |
| 5,547,499 | 8/1996 | Kawasumi et al. | ................. 106/31.64 |
| 5,606,055 | 2/1997 | Matsumoto et al. | ...................... 544/83 |

OTHER PUBLICATIONS

WPIDS Abstract No. 77–31994Y, abstract of Japanese Patent Specification No. 52–038551, Mar. 1977.
Chemical Abstract No. 67:3737, abstract of an article by Mihara et al entitled "Paint for electrodeposition . . . with epichlorohydrin", Shikizai Kyokaishi 39 (11) pp. 539–546, 1966.
Chemical Abstract No. 77:50305, abstract of French Patent Specification No. 2074799, Nov. 1971.

*Primary Examiner*—Anthony Green
*Attorney, Agent, or Firm*—Armstrong, Westerman, Hattori, McLeland and Naughton

[57] ABSTRACT

The present invention provides an aqueous pigment dispersion composition for electro-deposition color coating of an aluminum or aluminum alloy oxide film, the composition comprising an organic white pigment as an essential component thereof. The organic white pigment comprises large-diameter particles which are insoluble in a water-soluble organic liquid and/or water and exhibit a non-skinning property and a sufficient concealing power on an aluminum or aluminum alloy oxide film. More specifically, the organic white pigment particles preferably have an average particle diameters of at least 0.3 $\mu$m and a reflective index of at least 1.4. The use of the aqueous pigment dispersion composition for electro-deposition coating ensures formation of a less lustrous, less transparent and highly weather-resistant coating film for coloration of an aluminum or aluminum alloy oxide film.

12 Claims, No Drawings

AQUEOUS PIGMENT DISPERSION COMPOSITION FOR ELECTRO-DEPOSITION COLOR COATING

BACKGROUND OF THE INVENTION

1. Field of the Invention

The present invention relates to an aqueous pigment dispersion composition for electro-deposition color coating which is used to color an aluminum or aluminum alloy oxide film formed on a product, such as a building material or a vehicle wheel, made of aluminum or an aluminum alloy for use in a wide range of applications. More specifically, the invention relates to an aqueous pigment dispersion composition for electro-deposition color coating which is used as a pigment component of an electro-deposition coating liquid for formation of a matte coating film on an aluminum or aluminum alloy oxide film and provides for less lustrous, less transparent and highly weather-resistant coating properties.

2. Description of the Prior Art

One conventional method for forming an electro-deposition matte coating film on an aluminum or aluminum alloy oxide film includes the steps of immersing a lustrous electro-deposition coating film in an acid bath before the coating film cures, and promoting the curing of the coating surface. In another method, an emulsion of a non-polar resin such as polyethylene is blended with a lustrous electro-deposition coating liquid, and undulations are formed on the surface of the resulting coating film by utilizing the immiscibility between a base resin component and a wax component of the coating liquid and the vaporization of the wax component under heating. In this method, the fusion and thermal fluidity of the coating film at baking can be suppressed by preliminarily crosslinking emulsion particles (Coloring Materials, 66(11), 671–676 (1993)).

In these methods, however, consideration is given to a coating resin, but not to a pigment component, to provide for the matte coating property. It is essential to impart the matte (or less lustrous) coating property as well as an opaque (or less transparent) coating property to a coating film on an aluminum or aluminum alloy oxide film, because the surface of the aluminum or aluminum alloy oxide film should be concealed. Titanium oxide is conventionally used to provide for the opaque coating property. However, the use of titanium oxide is not preferred because of a poor weatherability, often resulting in chalking. Particularly, where a coating liquid containing titanium oxide is used for exterior materials such as aluminum building materials and aluminum wheels, the aforesaid problems are critical.

SUMMARY OF THE INVENTION

The present invention provides an aqueous pigment dispersion composition for electro-deposition color coating of an aluminum or aluminum alloy oxide film, the composition containing an organic white pigment as an essential component thereof.

The organic white pigment according to the invention comprises large-diameter particles which are insoluble in water and/or a water-soluble organic liquid and exhibit a non-skinning property and a sufficient concealing power on an aluminum or aluminum alloy oxide film. More specifically, the organic white pigment particles preferably have an average particle diameter of at least 0.3 µm and a refractive index of at least 1.4.

In the present invention, the aqueous pigment dispersion composition containing the organic white pigment instead of a conventionally used inorganic white pigment such as titanium oxide is blended as a pigment component with an electro-deposition coating liquid to be applied onto an aluminum or aluminum alloy oxide film to ensure the formation of a uniform and firm electro-deposition coating film having a low gloss, a low transparency and an excellent weatherability.

It is therefore an object of the present invention to provide an aqueous pigment dispersion composition which provides for less lustrous and less transparent coating properties and ensures an excellent weatherability for coloration of an aluminum or aluminum alloy oxide film.

DESCRIPTION OF THE PREFERRED EMBODIMENTS

The aqueous pigment dispersion composition of the present invention contains the organic white pigment as an essential component thereof, which is preferably dispersed in water or a mixture of water and a water-soluble organic solvent with the use of a dispersant.

One exemplary organic white pigment to be preferably used in this application is ethylene-bis-melamine. Like alkylene-bis-melamines and alkylene-bis-melamine derivatives represented by the general formula (1) which are to be described later, ethylene-bis-melamine is a white powdery substance having a high melting point, i.e., a melting point of not lower than 300° C., and accordingly an excellent heat-resistance. Ethylene-bis-melamine has a high whiteness and an excellent concealing power. An alkylene-bis-melamine such as ethylene-bis-melamine and an alkylene-bis-melamine derivative represented by the general formula (1), even if having a relatively large average particle diameter (i.e., 0.3 to 1.3 µm, preferably 0.4 to 1.0 µm), is dispersed in water or a mixture of water and a water-soluble organic solvent with the use of a dispersant, specifically, by using an anionic compound as the dispersant. The resulting dispersion has an excellent dispersibility and excellent electro-deposition coating properties for formation of a less lustrous and less transparent electro-deposition coating film on an aluminum or aluminum alloy oxide film. Therefore, the resulting coating film has a properly controlled gloss and transparency and an improved weatherability. That is, the use of the pigment having a large average particle diameter makes it possible to reduce the gloss and transparency of the coating film and improve the weatherability.

Other exemplary organic white pigments to be used as the pigment component for the electro-deposition color coating of an aluminum or aluminum alloy oxide film are resin particle pigments. The resin particle pigments are so-called plastic pigments, and examples thereof include fine particulate polymers and copolymers such as of polystyrene, polyacryl, polymethyl methacrylate, epoxy and styrene-acryl. The resin particle pigments preferably have a donut-like flat shape, a spherical shape or a hollow shape.

The organic white pigment preferably has an average particle diameter of 0.3 to 1.3 µm, optimally 0.4 to 1.0 µm. If the average particle diameter is smaller than 0.3 µm, it is difficult to reduce the gloss and transparency of the resulting electro-deposition coating film. If the average particle diameter is greater than 1.3 µm, the dispersibility of the pigment is unsatisfactory. Particularly, where the organic white pigment is blended as a pigment component of an electro-deposition coating liquid, an average particle diameter of greater than 1.3 µm is not preferable in terms of formation of a uniform electro-deposition coating film. Therefore, the average particle diameter of the organic white pigment is optimally in a range between 0.4 and 1.0 µm.

As described above, ethylene-bis-melamine is preferably used as the organic white pigment in the present invention. Alternatively, any of alkylene-bis-melamines and alkylene-bis-melamine derivatives represented by the general formula (1) may be used as the organic white pigment. For example, an ethylene-bis-melamine pigment available from HAKKO CHEMICAL Co., Ltd. under the trade name of "SHIGENOX OWP" can be used.

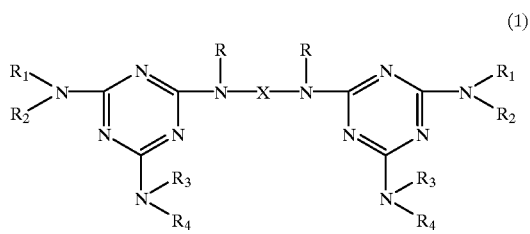
(1)

(wherein R is a hydrogen atom or an alkyl group or an alicyclic group having 1 to 4 carbons; R1, R2, R3 and R4 are the same or different, each representing a hydrogen atom or a lower alkyl group having 1 to 4 carbons, and R1 and R2 or R3 and R4 optionally forming a heterocyclic group with a nitrogen atom; and X is a lower alkylene group having 2 to 3 carbons.)

Examples of specific alkylene-bis-melamines and alklene-bis-melamine derivatives represented by the general formula (1) are shown in Table 1.

moles of ammonia (or mono- or di-lower alkylamine) is added drop by drop to the resulting dispersion maintained at 0 to 5° C. with stirring. Upon completion of the drop-by-drop addition, the resulting mixture is heated up to a temperature of 40 to 50° C. and allowed to react for about 3 hours. In turn, the resulting white crystal is filtered off. The thus obtained cake of 2,4-diamino(or mono- or di-lower alkylamino)-6-halogeno-1,3,5-triazine is dispersed in a proper amount of water, and ½ moles of alkylenediamine (or substituted alkylenediamine) is added thereto. The resulting mixture is allowed to react at 95 to 100° C. with stirring. During the reaction, an alkaline component is gradually consumed. While the temperature is kept at the same level, an aqueous solution containing 2 moles of sodium hydroxide is added drop by drop to the mixture within 2 hours. The reaction mixture once becomes transparent at about pH 8 but, soon after that, a white crystal is precipitated therefrom. The reaction mixture is further allowed to stand at 95 to 100° C. for about 3 hours for completion of the reaction, and then cooled. When the temperature of the reaction mixture reaches about 50° C., the pH of the mixture is adjusted to about 10 (weak alkalinity). The precipitated crystal is filtered off, and sufficiently rinsed with water and dried. Thus, the organic white pigment is obtained.

Preferably used as the resin particle pigment is a fine particulate polymer or copolymer, such as of polystyrene, polyacryl, acryl, epoxy or styrene-acryl, having a donut-like flat shape, a spherical shape or a hollow shape, as previously described. Specific examples thereof include a polystyrene particulate polymer of a donut-like flat shape available from

TABLE 1

| Specific formula No. | Substituent —N(R1)(R2) | —N(R3)(R4) | —R | —X— |
|---|---|---|---|---|
| 1 | —NH$_2$ | —NH$_2$ | —H | —CH$_2$CH$_2$— |
| 2 | —NH$_2$ | —NH$_2$ | —C$_6$H$_{11}$ (cyclohexyl) | —CH$_2$CH$_2$— |
| 3 | —NHCH$_3$ | —NHCH$_3$ | —H | —CH$_2$CH$_2$— |
| 4 | —N(CH$_3$)$_2$ | —N(CH$_3$)$_2$ | —H | —CH$_2$CH$_2$— |
| 5 | —N(C$_2$H$_5$)$_2$ | —N(C$_2$H$_5$)$_2$ | —H | —CH$_2$CH$_2$— |
| 6 | —N(C$_4$H$_9$)$_2$ | —N(C$_4$H$_9$)$_2$ | —H | —CH$_2$CH$_2$— |
| 7 | morpholino | morpholino | —H | —CH$_2$CH$_2$— |
| 8 | piperidino | piperidino | —H | —CH$_2$CH$_2$— |
| 9 | —NH$_2$ | —NH$_2$ | —CH$_3$ | —CH$_2$CH$_2$— |
| 10 | —NH$_2$ | —N(CH$_3$)$_2$ | —H | —CH$_2$CH$_2$— |
| 11 | —NH$_2$ | —NH$_2$ | —H | —CH$_2$CH$_2$CH$_2$— |

The organic white pigment represented by the general formula (1) is prepared in the following manner. First, 1 mole of a cyanuric halide such as cyanuric chloride is dispersed in ice-water along with a small amount of a surface active agent, and an aqueous solution containing 4

MITSUI TOATSU CHEMICAL Co., Ltd. under the trade name of "MUTICLE PP240D", polystyrene particulate polymers of a spherical shape available from MITSUI TOATSU CHEMICAL Co., Ltd. under the trade name of "MUTICLE PP101P" and from ASAHI CHEMICAL INDUSTRY Co., Ltd. under the trade name of "SB LATEX L-8801", an acryl particulate polymer of a spherical shape available from SOKEN CHEMICAL Co., Ltd. under the trade name of "MP1000", an epoxy particulate polymer of a spherical shape available from TORAY Co., Ltd. under the trade name of TORAYPEARL BP-B3000", particulate styrene-acryl copolymers of a spherical hollow shape available from DAINIPPON INK & CHEMICALS Inc. under the trade name of "GRANDOL PP1100" and from ROHM & HARSE Co. under the trade name of "ROPAQUE OP62".

For preparation of the aqueous pigment dispersion composition for electro-deposition color coating of an aluminum or aluminum alloy oxide film, the organic white pigment is added to the composition preferably in a proportion of about 5 to 60 wt %, optimally 10 to 40 wt %. If the proportion of the organic white pigment is less than 10 wt %, particularly less than 5 wt %, the concealing power of the resulting electro-deposition coating film is not satisfactory. Conversely, if the proportion is greater than 40 wt %, particularly greater than 60 wt %, an excess portion of the organic white pigment prevents formation of a uniform and firm electro-deposition coating film because the thickness and strength of the coating film are difficult to control. In addition, a greater amount of the pigment component is brought in the subsequent coating step, so that the use efficiency is not good. In other words, the concentration of the organic white pigment in the electro-deposition coating liquid in a coloring bath is preferably 0.5 to 10 wt %, more preferably 1 to 8 wt %. If the concentration of the organic white pigment is less than 1 wt %, particularly 0.5 wt %, the concealing power of the resulting electro-deposition coating film is not satisfactory. Conversely, if the concentration is greater than 8 wt %, particularly greater than 10 wt %, an excess portion of the organic white pigment prevents formation of a uniform and firm electro-deposition coating film because the thickness and strength of the coating film are difficult to control. In addition, a greater amount of the pigment component is brought in the subsequent coating step, so that the use efficiency is not good.

The organic white pigment to be used may be of a powdery type or of a dispersion (emulsion) type. The organic white pigment dispersion (emulsion) is available with its solid matter being dispersed therein and therefore can be used, as it is, as an aqueous pigment dispersion composition containing the organic white pigment.

The pigment component should contain the organic white pigment as its essential component. If the aqueous pigment dispersion composition is to be colored, any of various organic and inorganic color pigments may be added thereto. Exemplary organic color pigments include carbon black, and azo-, phthalocyanine-, quinacridone-, anthraquinone-, dioxazine-, indigo-, thioindigo-, perinone-, perylene-, isoindoline-, azomethine azo-, indanthrene-, and diketopyrrolopyrrole-type pigments. Exemplary inorganic color pigments include black iron ($FeO.Fe_2O_3$), red iron ($Fe_2O_3$), yellow iron ($FeO(OH)_n.H_2O$), cobalt blue, cobalt green, Prussian blue, and cobalt violet.

Anionic compounds are preferably used as the dispersant for the aqueous pigment dispersion compound. Among those, an anionic compound having either a carboxy group or a sulfone group exhibiting a high ion strength is highly compatible with the organic white pigment, particularly the one represented by the general formula (1), and the particulate resin pigment. Even if the organic white pigment has a relatively large average particle diameter, i.e., 0.3 to 1.3 μm, the use of such an anionic compound allows the resulting aqueous pigment dispersion composition to have an excellent dispersibility and excellent electro-deposition coating properties and to ensure that a uniform and firm coating film free from color shading can be formed on an anodized aluminum or aluminum alloy film. Particularly preferred anionic compounds are polymers and copolymers of acrylic acid and derivatives thereof, copolymers or modified copolymers of acrylic acid or a derivative thereof and one or more monomers polymerizable therewith, and anionic surface active agents. Examples of specific monomers polymerizable with acrylic acid or an acrylate such as methyl acrylate or a derivative thereof include α,β-ethylene monomers such as vinyl chloride and vinyl acetate and derivatives thereof, and maleic acid anhydride and derivatives thereof. At least one of these monomers is used as the polymerizable monomer. Usable as the anionic surface active agent is any of various known anionic surface active agents. Particularly, the use of a styrene-acrylic acid copolymer or a styrene-maleic acid copolymer ensures effective dispersion of particles of the organic white pigment, producing a favorable effect on the electro-deposition coating.

Where the organic white pigment represented by the general formula (1), particularly ethylene-bis-melamine, is used, however, the dispersibility of ethylene-bis-melamine is highly dependent on the pH of the resulting aqueous pigment dispersion composition. It has been found that a pigment dispersion composition, for example, having a pigment concentration of 20% loses its fluidity at a pH of higher than 9. Particularly where the pigment dispersion composition is used for aluminum electro-deposition coating, the dispersion composition needs to have a sufficient fluidity toward an anode. As described above, the organic white pigment is dispersed with the use of the anionic resin dispersant in the present invention. The anionic resin dispersant needs to be once dissolved in a solvent such as triethylamine or dimethylaminoethanol to prepare a varnish. The pH of the varnish greatly influences the dispersibility of ethylene-bis-melamine and, at the same time, determines the pH of the pigment dispersion composition. More specifically, the result of an experiment in which a styrene-acrylic acid resin to be used as the dispersant was neutralized with triethylamine indicates that the dispersibility is satisfactory at a pH of not higher than 9, but the fluidity is lost at a pH of higher than 9 so that the dispersibility is deteriorated. If triethylamine is blended in a proportion greater than a predetermined level with the anionic dispersant, the fluidity is lost supposedly due to the presence of free hydroxyl ions resulting from a certain reaction between free amine and ethylene-bis-melamine. Therefore, the aqueous pigment dispersion composition according to the present invention preferably has a pH of 7 to 9. An aqueous pigment dispersion composition having a pH of lower than 7 is not suitable for aluminum electro-deposition coating which takes place on an anode.

It has also been found that the electrophoretic mobility for the electro-deposition coating can be controlled by the acid value of the dispersant to be used in the aqueous pigment dispersion composition of the present invention, whereby the deposition thickness can be controlled. That is, the gloss of the resulting electro-deposition coating can be controlled so that the electro-deposition coating can have either a matte surface or a lustrous surface. If a styrene-acrylic acid resin with an acid value of 200 available from JOHNSON POLYMER Co. under the trade name of "JOHNSON POLYMER J679" is compared with a styrene-acrylic acid resin with an acid value of 80 available from SEIKO KAGAKU Co., Ltd. under the trade name of "SEIKO KAGAKU H1712", for example, an aqueous pigment dispersion composition containing the styrene-acrylic acid resin with an acid value of 80 (SEIKO KAGAKU H1712) can be electro-deposited about twice as readily as that containing the styrene-acrylic acid resin with an acid value of 200 (JOHNSON POLYMER J679) to the same coating thickness under the same conditions. A resin emulsion typically used for formation of a transparent electro-deposition coating has an acid value of about 50. Therefore, when an anionic dispersant having a lower acid value than the typical dispersant is used, the electro-deposition of the pigment dispersion composition is increased thereby to form a thick electro-deposition coating film. Conversely, when an anionic dispersant having a higher acid value than the typical dispersant is used, the electro-deposition of the pigment dispersion composition is reduced thereby to form a thin electro-deposition coating film containing the pigment component in a reduced amount. To form a matte electro-deposition coating film, it is preferred to use an anionic dispersant having a low acid value which increases the deposition of the resin pigment. To form a lustrous electro-deposition coating, it is preferred to use an anionic dispersant having a high acid value which decreases the deposition of the resin pigment. More specifically, an anionic dispersant having an acid value of 50 to 150 is preferably used for formation of a matte electro-deposition coating film.

A dispersion of the organic white pigment is prepared by using any of various conventional dispersing machines such as a bead mill, a ball mill, a sand mill, a roll mill and a homomixer. Preferably used for controlling the volatilization rate of a solvent from the dispersion are alcohols such as methanol and ethanol, glycols such as ethylene glycol and propylene glycol, esters of such alcohols and glycols, and aqueous organic liquids such as alkanolamines. Where a powder-type organic white pigment such as comprising particles of an alkylene-bis-melamine or an alkylene-bis-melamine derivative represented by the general formula (1), or polymethyl methacrylate spherical particles (e.g., available from SOKEN CHEMICAL Co., Ltd. under the trade name of "MP 1000") is used, it is particularly preferred to use a bead mill. Where a dispersion-type organic white pigment such as comprising polystyrene spherical particles, epoxy spherical particles, or styrene-acrylic spherical hollow particles is used, a homomixer is preferably used.

Any of known electro-deposition paints can be blended with the aqueous pigment dispersion composition. Typical examples thereof include acryl-melamine emulsion paints and fluorine-melamine emulsion paints. An electro-deposition coating liquid can be prepared, for example, by blending the aqueous pigment dispersion composition of the present invention as the pigment component with known ingredients of an electro-deposition coating liquid including a water-soluble acryl-melamine resin, butyl cellosolve, isopropyl alcohol, 2-dimethylaminoethanol, deionized water and the like. The ingredients of the electro-deposition coating liquid other than the pigment component are not particularly limited. Where the aforesaid ingredients are used, it is preferred to blend 100 to 300 parts by weight of the aqueous pigment dispersion composition of the present invention with about 200 parts by weight of the water-soluble acryl-melamine resin, 7 to 9 parts by weight of butyl cellosolve, 1 to 3 parts by weight of isopropyl alcohol, 1 to 3 parts by weight of 2-dimethylaminoethanol, and 450 to 700 parts by weight of deionized water.

Conditions for the electro-deposition coating are not particularly limited, but those known in the art may be employed. For example, an aluminum or aluminum alloy product preliminarily surface-treated to be formed with an anodic oxide film is first set on an anode in an electro-deposition bath with a carbon rod set on a cathode, and the electro-deposition bath is filled with an electro-deposition coating liquid containing the aqueous pigment dispersion composition of the present invention as the pigment component. Then, a direct current voltage is applied between the anode and the cathode, and the resulting coating film is baked.

Since the aqueous pigment dispersion composition of the present invention contains the organic white pigment as its essential component, the formation of a less lustrous and less transparent coating film can be achieved by using the aqueous pigment dispersion composition as a pigment component of an electro-deposition coating liquid for electro-deposition color coating of an aluminum or aluminum alloy oxide film. Unlike the conventional aluminum electro-deposition coating, the use of the aqueous pigment dispersion composition of the present invention eliminates the need for modifying the resin component to provide for a matte coating property and the need for adding titanium oxide to reduce the transparency for enhancement of the concealing power. Therefore, sufficiently matte electro-deposition coating of an aluminum or aluminum oxide film can be realized by using the aqueous pigment dispersion composition of the present invention alone which contains the organic white pigment. Since the aqueous pigment dispersion composition contains as its essential component the organic white pigment instead of titanium oxide, the chalking due to the addition of titanium oxide can be prevented, so that the weatherability can be improved.

The aqueous pigment dispersion composition of the present invention is applicable to the electro-deposition coating of various products made of aluminum or an aluminum alloy, for example, sashes, doors, exterior panels and exterior products for building structures such as houses, and aluminum die-cast products such as aluminum wheels.

EXAMPLES

Example 1

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 679") neutralized with triethylamine | 5 parts |
| Propylene glycol | 8 parts |
| Deionized water | 67 parts |

A pigment dispersion of the above formulation containing the organic white pigment having an average particle diameter of 0.7 µm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-µm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |

-continued

| | |
|---|---|
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 2

| | |
|---|---|
| Ethylene-bis-melamine (organic white pigment available from HAKKO CHEMICAL Co., Ltd. under the trade name of "SHIGENOX OWP" and having a solid content of greater than 99%) | 25 parts |
| Solution of 20% styrene-acrylic acid resin (available from JOHNSON POLYMER Co. under the trade name of "JOHNCRYL 679") neutralized with triethylamine (dispersant) | 6 parts |
| Propylene glycol | 8 parts |
| Deionized water | 61 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 8 parts by weight |
| Isopropyl alcohol | 2 parts by weight |
| 2-dimethylaminoethanol | 2 parts by weight |
| Deionized water | 500 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 3

| | |
|---|---|
| Ethylene-bis-melamine (organic white pigment available from HAKKO CHEMICAL Co., Ltd. under the trade name of "SHIGENOX OWP" and having a solid content of greater than 99%) | 30 parts |
| Solution of 20% styrene-acrylic acid resin (available from JOHNSON POLYMER Co. under the trade name of "JONCRYL 679") neutralized with triethylamine (dispersant) | 8 parts |
| Ethylene glycol | 8 parts |
| Deionized water | 54 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 300 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 4

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Ethylene glycol | 8 parts |
| Deionized water | 67 parts |

A pigment dispersion of the above formulation containing the organic white pigment having an average particle diameter of 0.7 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 5

| | |
|---|---|
| Ethylene-bis-melamine (organic white pigment available from HAKKO CHEMICAL Co., Ltd. under the trade name of "SHIGENOX OWP" and having a solid content of greater than 99%) | 25 parts |
| Solution of 20% styrene-acrylic acid resin (available from JOHNSON POLYMER Co. under the trade name of "JONCRYL 679") neutralized with sodium ions (dispersant) | 6 parts |
| Ethylene glycol | 8 parts |
| Deionized water | 61 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 8 parts by weight |
| Isopropyl alcohol | 2 parts by weight |
| 2-dimethylaminoethanol | 2 parts by weight |
| Deionized water | 700 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 6

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-maleic acid resin (available from SEIKO CHEMICAL INDUSTRY Co., Ltd. under the trade name of "HI-ROS X-220") neutralized with triethylamine | 5 parts |
| Propylene glycol | 8 parts |
| Deionized water | 67 parts |

A pigment dispersion of the above formulation containing the organic white pigment having an average particle diameter of 0.7 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 7

| | |
|---|---|
| Ethylene-bis-melamine (organic white pigment available from HAKKO CHEMICAL Co., Ltd. under the trade name of "SHIGENOX OWP" and having a solid content of greater than 99%) | 25 parts |
| Solution of 20% styrene-maleic acid resin (available from SEIKO CHEMICAL INDUSTRY Co., Ltd. under the trade name of "HI-ROS X-220") neutralized with triethylamine | 6 parts |
| Propylene glycol | 8 parts |
| Deionized water | 61 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 8

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Anionic polymeric surface active agent of polycarboxylic acid type (available from KAO Co., Ltd. under the trade name of "DEMOL EP") | 5 parts |
| Propylene glycol | 8 parts |
| Deionized water | 67 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 9

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Sodium salt of condensate of naphthalene sulfonate and formalin (available from KAO Co., Ltd. under the trade name of "DEMOL P") | 5 parts |
| Propylene glycol | 8 parts |
| Deionized water | 67 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 10

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Anionic polymeric surface active agent of polycarboxylic acid type (available from NIPPON YUSHI Co., Ltd. under the trade name of "NISSAN POLYSTAR") | 5 parts |
| Propylene glycol | 8 parts |
| Deionized water | 67 parts |

A pigment dispersion of the above formulation containing the organic white pigment having an average particle diameter of 0.8 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 450 parts by weight |
| Aqueous pigment dispersion composition | 100 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 11

| | |
|---|---|
| Donut-like flat particles of polystyrene polymer (organic white pigment dispersion available from MITSUI TOATSU CHEMICAL Co., Ltd. under the trade name of "MUTICLE PP240D" and having a solid content of 44% and an average particle diameter of 0.5 pm) | 50 parts |
| Solution of 20% styrene-acrylic acid resin (available from JOHNSON POLYMER Co. under the trade name of "JONCRYL 697") neutralized with triethylamine | 2 parts |
| Propylene glycol | 8 parts |
| Deionized water | 40 parts |

A pigment dispersion of the above formulation containing the organic white pigment was prepared by using a homomixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 12

| | |
|---|---|
| Donut-like flat particles of polystyrene polymer (organic white pigment dispersion available from MITSUI TOATSU CHEMICAL Co., Ltd. under the trade name of "MUTICLE PP240D" and having a solid content of 44% and an average particle diameter of 0.5 pm) | 50 parts |
| Solution of 20% styrene-acrylic acid resin (available from JOHNSON POLYMER Co. under the trade name of "JONCRYL 683") neutralized with triethylamine | 2 parts |
| Propylene glycol | 8 parts |
| Deionized water | 40 parts |

A pigment dispersion of the above formulation containing the organic white pigment was prepared by using a homomixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 13

| | |
|---|---|
| Donut-like flat particles of polystyrene polymer (organic white pigment dispersion available from MITSUI TOATSU CHEMICAL Co., Ltd. under the trade name of "MUTICLE PP240D" and having a solid content of 44% and an average particle diameter of 0.5 μm) | 50 parts |
| Solution of 20% styrene-maleic acid resin (available from SEIKO CHEMICAL INDUSTRY Co., Ltd under the trade name of "HI-ROS X-220") neutralized with triethylamine | 2 parts |
| Propylene glycol | 8 parts |
| Deionized water | 40 parts |

A pigment dispersion of the above formulation containing the organic white pigment was prepared by using a homomixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 14

| | |
|---|---|
| Spherical particles of polystyrene polymer (organic white pigment dispersion available from MITSUI TOATSU CHEMICAL Co., Ltd. under the trade name of "MUTICLE PP101P" and having a solid content of 44% and an average particle diameter of 0.6 µm) | 50 parts |
| Solution of 20% styrene-acrylic acid resin (available from JOHNSON POLYMER Co. under the trade name of "JONCRYL 679") neutralized with triethylamine | 2 parts |
| Propylene glycol | 8 parts |
| Deionized water | 40 parts |

A pigment dispersion of the above formulation containing the organic white pigment was prepared by using a homo-mixer. In turn, an electro-deposition coating liquid of the following formulation containing the aqueous pigment dispersion thus prepared was filled in an electro-deposition bath in which a carbon rod was set on a cathode and an aluminum plate formed with a 9-µm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 15

| | |
|---|---|
| Spherical particles of polystyrene polymer (organic white pigment dispersion available from MITSUI TOATSU CHEMICAL Co., Ltd. under the trade name of "MUTICLE PP101P" and having a solid content of 44% and an average particle diameter of 0.6 µm) | 50 parts |
| Solution of 20% styrene-maleic acid resin (available from SEIKO CHEMICAL INDUSTRY Co., Ltd. under the trade name of "HI-ROS X-220") neutralized with triethylamine | 2 parts |
| Ethylene glycol | 8 parts |
| Deionized water | 40 parts |

A pigment dispersion of the above formulation containing the organic white pigment was prepared by using a homo-mixer. In turn, an electro-deposition coating liquid of the following formulation containing the aqueous pigment dispersion thus prepared was filled in an electro-deposition bath in which a carbon rod was set on a cathode and an aluminum plate formed with a 9-µm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 16

| | |
|---|---|
| Spherical particles of polystyrene-type polymer (organic white pigment dispersion available from ASAHI CHEMICAL INDUSTRY Co., Ltd. under the trade name of "SB LATEX L-8801" and having a solid content of 50% and an average particle diameter of 0.5 µm) | 40 parts |
| Solution of 20% styrene-acrylic acid resin (available from JOHNSON POLYMER Co. under the trade name of "JONCRYL 679") neutralized with triethylamine | 1 part |
| Propylene glycol | 8 parts |
| Deionized water | 51 parts |

A pigment dispersion of the above formulation containing the organic white pigment was prepared by using a homo-mixer. In turn, an electro-deposition coating liquid of the following formulation containing the aqueous pigment dispersion thus prepared was filled in an electro-deposition bath in which a carbon rod was set on a cathode and an aluminum plate formed with a 9-µm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 17

| | |
|---|---|
| Spherical particles of polymethyl methacrylate polymer (organic white pigment available from SOKEN CHEMICAL Co., Ltd. under the trade name of "MP 1000") | 20 parts |
| Solution of 20% styrene-maleic acid resin (available from SEIKO CHEMICAL INDUSTRY Co., Ltd. under the trade name of "HI-ROS X-220") neutralized with triethylamine | 5 parts |
| Ethylene glycol | 8 parts |
| Deionized water | 67 parts |

A pigment dispersion of the above formulation containing the organic white pigment having an average particle diameter of 0.4 μm was prepared by using a bead mill. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 18

| | |
|---|---|
| Spherical epoxy particles (organic white pigment dispersion available from TORAY Co., Ltd. under the trade name of "TORAYPEARL BP-B3000" and having a solid content of 30% and an average particle diameter of 0.5 μm) | 60 parts |
| Solution of 20% styrene-acrylic acid resin (available from JOHNSON POLYMER Co. under the trade name of "JONCRYL 679") neutralized with triethylamine | 2 parts |
| Propylene glycol | 8 parts |
| Deionized water | 30 parts |

A pigment dispersion of the above formulation containing the organic white pigment was prepared by using a homo-mixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 19

| | |
|---|---|
| Spherical hollow particles of styrene-acryl copolymer (organic white pigment dispersant available from DAINIPPON INK & CHEMICALS Inc. under the trade name of "GRANDOL PP1100" and having a solid content of greater than 36% and an average particle diameter of 0.55 μm) | 60 parts |
| Solution of 20% styrene-maleic acid resin (available from SEIKO CHEMICAL INDUSTRY Co., Ltd. under the trade name of "HI-ROS X-220") neutralized with triethylamine | 2 parts |
| Ethylene glycol | 8 parts |
| Deionized water | 30 parts |

A pigment dispersion of the above formulation containing the organic white pigment was prepared by using a homo-mixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 20

| | |
|---|---|
| Spherical hollow particles of styrene-acryl copolymer (organic white piqment dispersion available from ROHM & HARSE Co. under the trade name of "ROPAQUE OP62" and having a solid content of 37% and an average particle diameter of 0.4 μm) | 60 parts |
| Solution of 20% styrene-acrylic acid resin (available from JOHNSON POLYMER Co. under the trade name of "JONCRYL 683") neutralized with triethylamine | 2 parts |
| Propylene glycol | 8 parts |
| Deionized water | 30 parts |

A pigment dispersion of the above formulation containing the organic white pigment was prepared by using a homomixer. In turn, an electro-deposition coating liquid of the following formulation containing the aqueous pigment dispersion thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 9 parts by weight |
| Isopropyl alcohol | 3 parts by weight |
| 2-dimethylaminoethanol | 3 parts by weight |
| Deionized water | 600 parts by weight |
| Aqueous pigment dispersion composition | 200 parts by weight |

After a direct current voltage of 120 V was applied between the anode and the cathode for 5 minutes, the resulting aluminum plate was baked at 180° C. for 30 minutes. Thus, the coating process was completed. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 21

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Propylene glycol | 8 parts |
| Deionized water | 67 parts |

A pigment dispersion of the above formulation containing the organic white pigment having an average particle diameter of 0.7 μm was prepared by using a bead mill.

| | |
|---|---|
| Furnace carbon (organic black pigment available from CABOT Corp. under the trade name of "MONARCH 800") | 20 parts |
| Solution of 20% styrene-acrylic acid resin (available from JOHNSON POLYMER Co. under the trade name of "JONCRYL 683") neutralized with triethylamine (dispersant) | 20 parts |
| Propylene glycol | 8 parts |
| Deionized water | 52 parts |

Another pigment dispersion of the above formulation containing the organic black pigment having an average particle diameter of 0.1 μm was prepared by using a bead mill. In turn, an electro-deposition coating liquid of the following formulation containing the two aqueous pigment dispersions thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 670 parts by weight |
| Aqueous white pigment dispersion composition | 120 parts by weight |
| Aqueous black pigment dispersion composition | 1 part by weight |

After a direct current voltage of 120 V was applied between the anode and the cathode for 5 minutes, the resulting aluminum plate was baked at 180° C. for 30 minutes. Thus, the coating process was completed thereby to form a gray coating film on the aluminum plate. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 22

| | |
|---|---:|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Propylene glycol | 8 parts |
| Deionized water | 67 parts |

A pigment dispersion of the above formulation containing the organic white pigment having an average particle diameter of 0.7 μm was prepared by using a bead mill.

| | |
|---|---:|
| Phthalocyanine blue (organic blue pigment available from DAINIPPON INK & CHEMICALS Inc. under the trade name of "FASTOGEN BLUE TGR") | 20 parts |
| Solution of 20% styrene-acrylic acid resin (available from JOHNSON POLYMER Co. under the trade name of "JONCRYL 683") neutralized with triethylamine (dispersant) | 20 parts |
| Propylene glycol | 8 parts |
| Deionized water | 52 parts |

Another pigment dispersion of the above formulation containing the organic blue pigment having an average particle diameter of 0.1 μm was prepared by using a bead mill. In turn, an electro-deposition coating liquid of the following formulation containing the two aqueous pigment dispersions thus prepared was filled in an electro-deposition bath in which a carbon rod was set on a cathode and an aluminum plate formed with a 9-μm thick anodic oxide film by a surface treatment was set on an anode.

| | |
|---|---:|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 670 parts by weight |
| Aqueous white pigment dispersion composition | 120 parts by weight |
| Aqueous blue pigment dispersion composition | 1 part by weight |

After a direct current voltage of 120 V was applied between the anode and the cathode for 5 minutes, the resulting aluminum plate was baked at 180° C. for 30 minutes. Thus, the coating process was completed thereby to form a blue coating film on the aluminum plate. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 23

| | |
|---|---:|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Propylene glycol | 8 parts |
| Deionized water | 67 parts |

A pigment dispersion of the above formulation containing the organic white pigment having an average particle diameter of 0.7 μm was prepared by using a bead mill.

| | |
|---|---:|
| Chlorinated phthalocyanine green (organic green pigment available from DAINIPPON INK & CHEMICALS Inc. under the trade name of "FASTOGEN GREEN B") | 20 parts |
| Solution of 20% styrene-acrylic acid resin (available from JOHNSON POLYMER Co. under the trade name of "JONCRYL 683") neutralized with triethylamine (dispersant) | 20 parts |
| Propylene glycol | 8 parts |
| Deionized water | 52 parts |

Another pigment dispersion of the above formulation containing the organic green pigment having an average particle diameter of 0.1 μm was prepared by using a bead mill. In turn, an electro-deposition coating liquid of the following formulation containing the two aqueous pigment dispersions thus prepared was filled in an electro-deposition bath in which a carbon rod was set on a cathode and an aluminum plate formed with a 9-μm thick anodic oxide film by a surface treatment was set on an anode.

| | |
|---|---:|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 670 parts by weight |
| Aqueous white pigment dispersion composition | 120 parts by weight |
| Aqueous green pigment dispersion composition | 1 part by weight |

After a direct current voltage of 120 V was applied between the anode and the cathode for 5 minutes, the resulting aluminum plate was baked at 180° C. for 30 minutes. Thus, the coating process was completed thereby to form a green coating film on the aluminum plate. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 24

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Propylene glycol | 8 parts |
| Deionized water | 67 parts |

A pigment dispersion of the above formulation containing the organic white pigment having an average particle diameter of 0.7 μm was prepared by using a bead mill.

| | |
|---|---|
| Diketopyrrolopyrrole (organic red pigment available from CIVA SPECIALTY CHEMICALS Inc. under the trade name of "IRGAZIN DPP RUBIN TR") | 20 parts |
| Solution of 20% styrene-acrylic acid resin (available from JOHNSON POLYMER Co. under the trade name of "JONCRYL 683") neutralized with triethylamine (dispersant) | 20 parts |
| Propylene glycol | 8 parts |
| Deionized water | 52 parts |

Another pigment dispersion of the above formulation containing the organic red pigment having an average particle diameter of 0.1 μm was prepared by using a bead mill. In turn, an electro-deposition coating liquid of the following formulation containing the two aqueous pigment dispersions thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 670 parts by weight |
| Aqueous white pigment dispersion composition | 120 parts by weight |
| Aqueous red pigment dispersion composition | 1 part by weight |

After a direct current voltage of 120 V was applied between the anode and the cathode for 5 minutes, the resulting aluminum plate was baked at 180° C. for 30 minutes. Thus, the coating process was completed thereby to form a red coating film on the aluminum plate. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Example 25

| | |
|---|---|
| Ethylene-bis-melamine (organic white pigment available from HAKKO CHEMICAL Co., Ltd. under the trade name of "SHIGENOX OWP" and having a solid content of greater than 99%) | 20 parts |
| Solution of 20% styrene-acrylic acid resin (available from JOHNSON POLYMER Co. under the trade name of "JONCRYL 683") neutralized with triethylamine (dispersant) | 5 parts |
| Propylene glycol | 8 parts |
| Deionized water | 67 parts |

A pigment dispersion of the above formulation containing the organic white pigment having an average particle diameter of 0.7 μm was prepared by using a bead mill.

| | |
|---|---|
| Quinacridone solid solution (organic orange pigment available from CIVA SPECIALTY CHEMICALS Inc. under the trade name of "CINQUASIA GOLD YT919D") | 20 parts |
| Solution of 20% styrene-acrylic acid resin (available from JOHNSON POLYMER Co. under the trade name of "JONCRYL 683") neutralized with triethylamine (dispersant) | 20 parts |
| Propylene glycol | 8 parts |
| Deionized water | 52 parts |

Another pigment dispersion of the above formulation containing the organic orange pigment having an average particle diameter of 0.1 μm was prepared by using a bead mill. In turn, an electro-deposition coating liquid of the following formulation containing the two aqueous pigment dispersions thus prepared was filled in an electro-deposition bath in which a carbon rod was set on a cathode and an aluminum plate formed with a 9-μm thick anodic oxide film by a surface treatment was set on an anode.

| | |
|---|---|
| Water-soluble acryl-melamine resin | 200 parts by weight |
| Butyl cellosolve | 7 parts by weight |
| Isopropyl alcohol | 1 part by weight |
| 2-dimethylaminoethanol | 1 part by weight |
| Deionized water | 670 parts by weight |
| Aqueous white pigment dispersion composition | 120 parts by weight |
| Aqueous orange pigment dispersion composition | 1 part by weight |

After a direct current voltage of 120 V was applied between the anode and the cathode for 5 minutes, the resulting aluminum plate was baked at 180° C. for 30 minutes. Thus, the coating process was completed thereby to form an orange coating film on the aluminum plate. The coating liquid in the electro-deposition bath was initially homogeneous. The baked electro-deposition coating film on the aluminum plate was free from color shading and had a matte surface with a low gloss, a low transparency and a high concealing power. The resulting aluminum plate was subjected to an accelerated weathering test (dew cycle test) for 80 hours. As a result, substantially no change was observed on the surface of the aluminum plate.

Measurement of Gloss

The gloss of each of the coating films obtained in Examples 1 to 25 was measured in compliance with JIS H8602, JIS Z8741 and JIS D020 by means of a gloss checker IG-310 available from HORIBA SEISAKUSHO Co., Ltd. The specifications of the gloss checker are as follows: a measuring scale of 0 to 100 with a resolution of 1; an optical system with light incident angles of greater than 60° and a light receiving angle of 60° (specular gloss Gs[60°]); and a reproducibility of ±2% with respect to the full scale. The rating of the gloss was determined as follows. If the specular gloss (Gs[60°]) is not lower than 80%, the rating is "LUSTROUS". If the specular gloss is lower than 80% and not lower than 20%, the rating is "SEMI-LUSTROUS". If the specular gloss is lower than 20%, the rating is "LUSTERLESS". Coating films rated as "SEMI-LUSTROUS" and "LUSTERLESS" are considered to be matte. As a result, the coating films of Examples 1 to 10 and 21 to 25 were rated as "LUSTERLESS" with glosses of 0 to 5% and the coating films of Examples 11 to 20 were rated as "SEMI-LUSTROUS" or "LUSTERLESS" with glosses of 15 to 40%, while the conventional electro-deposition coating films are typically rated as "LUSTROUS" with glosses of higher than 80%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A composition for electro-deposition on an aluminum oxide film or an aluminum alloy oxide film, said composition comprising:
   (a) a dispersion of an organic white pigment, and
   (b) a composition for electro-deposition paint,
   wherein the organic white pigment is selected from the group consisting of:
      (i) alkylene-bis-melamine compounds represented by the following formula (1):

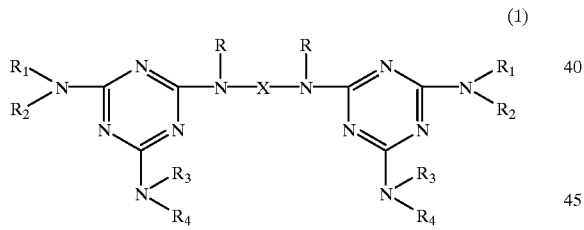

(1)

wherein R is a hydrogen atom, an alkyl group or an alicyclic group having 1 to 4 carbons; $R_1$, R2, $R_3$ and $R_4$ are the same or different, each representing a hydrogen atom or a lower alkyl group having 1 to 4 carbons, and $R_1$ and $R_2$ or $R_3$ and $R_4$ optionally forming a heterocyclic group with a nitrogen atom; and X is a lower alkylene group having 2 to 3 carbons; and
      (ii) polystyrene, polyacrylates and styrene-acrylate copolymers,
   and wherein the concentration of the organic white pigment is from 0.5 to 10% by weight.

2. A composition for electro-deposition on an aluminum oxide film or an aluminum alloy oxide film as set forth in claim 1, wherein the concentration of the organic white pigment is from 1 to 8% by weight.

3. An electro-deposition coating method comprising the step of electro-depositing on an aluminum oxide film or an aluminum alloy oxide film a composition comprising:
   (a) a dispersion of an organic white pigment, and
   (b) a composition for electro-deposition paint,
   wherein the organic white pigment is selected from the group consisting of:
      (i) alkylene-bis-melamine compounds represented by the following formula (1):

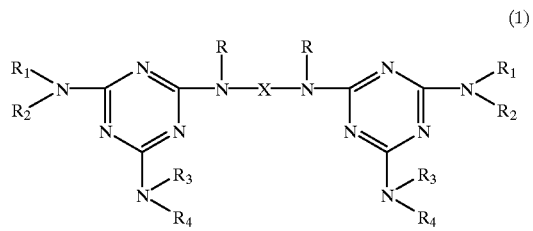

(1)

wherein R is a hydrogen atom, an alkyl group or an alicyclic group having 1 to 4 carbons; $R_1$, $R_2$, $R_3$ and $R_4$ are the same or different, each representing a hydrogen atom or a lower alkyl group having 1 to 4 carbons, and $R_1$ and $R_2$ or $R_3$ and $R_4$ optionally forming a heterocyclic group with a nitrogen atom; and X is a lower alkylene group having 2 to 3 carbons; and
      (ii) polystyrene, polyacrylates, and styrene-acrylate copolymers,
   and wherein the concentration of the organic white pigment is from 0.5 to 10% by weight.

4. A method as set forth in claim 3, wherein the concentration of the organic white pigment is from 1 to 8% by weight.

5. A coated article comprising:
   (1) a film of aluminum oxide or aluminum alloy oxide on a surface of said article; and
   (2) a coating of a composition comprising:
      (a) a dispersion of an organic white pigment, and
      (b) a composition for electro-deposition paint;
      said coating being applied on said film of aluminum oxide or aluminum alloy oxides,
      wherein the organic white pigment is selected from the group consisting of:
         (i) alkylene-bis-melamine compounds represented by the following formula (1):

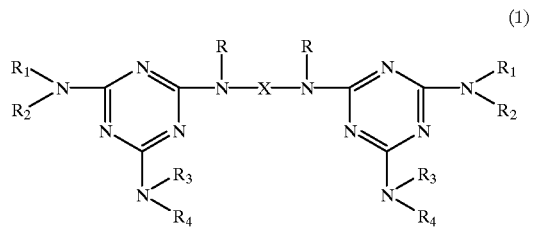

(1)

wherein R is a hydrogen atom, an alkyl group or an alicyclic group having 1 to 4 carbons; $R_1$, $R_2$, $R_3$ and $R_4$ are the same or different, each representing a hydrogen atom or a lower alkyl group having 1 to 4 carbons, and $R_1$ and $R_2$ or $R_3$ and R4 optionally forming a heterocyclic group with a nitrogen atom; and X is a lower alkylene group having 2 to 3 carbons; and
         (ii) polystyrene, polyacrylates, and styrene-acrylate copolymers,
      and wherein the concentration of the organic white pigment is from 0.5 to 10% by weight.

6. An article as set forth in claim 5, wherein the concentration of the organic white pigment is from 1 to 8% by weight.

7. An article as set forth in claim 5 wherein said coating is a matte coating.

8. An aqueous pigment dispersion composition for electro-deposition color coating of aluminum or aluminum alloy oxide film, comprising an organic white pigment, an anionic compound as a dispersant and water or water containing a water-soluble organic solvent, wherein said organic white pigment has an average particle diameter of 0.3 to 1.3 μm and a reflective index of at least 1.4, wherein the organic white pigment is selected from the group consisting of:
(i) alkylene-bis-melamine compounds represented by the following formula (1):

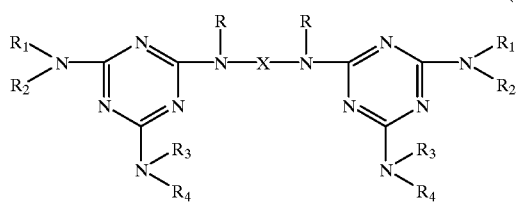

(1)

wherein R is a hydrogen atom, an alkyl group or an alicyclic group having 1 to 4 carbons; $R_1, R_2, R_3$ and $R_4$ are the same or different, each representing a hydrogen atom or a lower alkyl group having 1 to 4 carbons, and $R_1$ and $R_2$ or $R_3$ and $R_4$ optionally forming a heterocyclic group with a nitrogen atom; and X is a lower alkylene group having 2 to 3 carbons; and (ii) polystyrene, polyacrylates, and styrene-acrylate copolymers, and wherein the composition comprises 5 to 60% by weight of the organic white pigment.

9. A composition as set forth in claim 8, wherein the pH of the composition is from 7 to 9.

10. A composition as set forth in claim 8, wherein the acid value of the anionic compound is between 50 and 150.

11. A composition as set forth in claim 8, wherein the anionic compound is styrene-acrylic copolymer or styrene-maleic copolymer.

12. A composition as set forth in claim 8, further comprising a color pigment.

* * * * *